March 13, 1945. E. B. ATKINSON 2,371,210
SUPPORT FOR WIRING RECEPTACLES
Filed Aug. 3, 1940 2 Sheets-Sheet 1
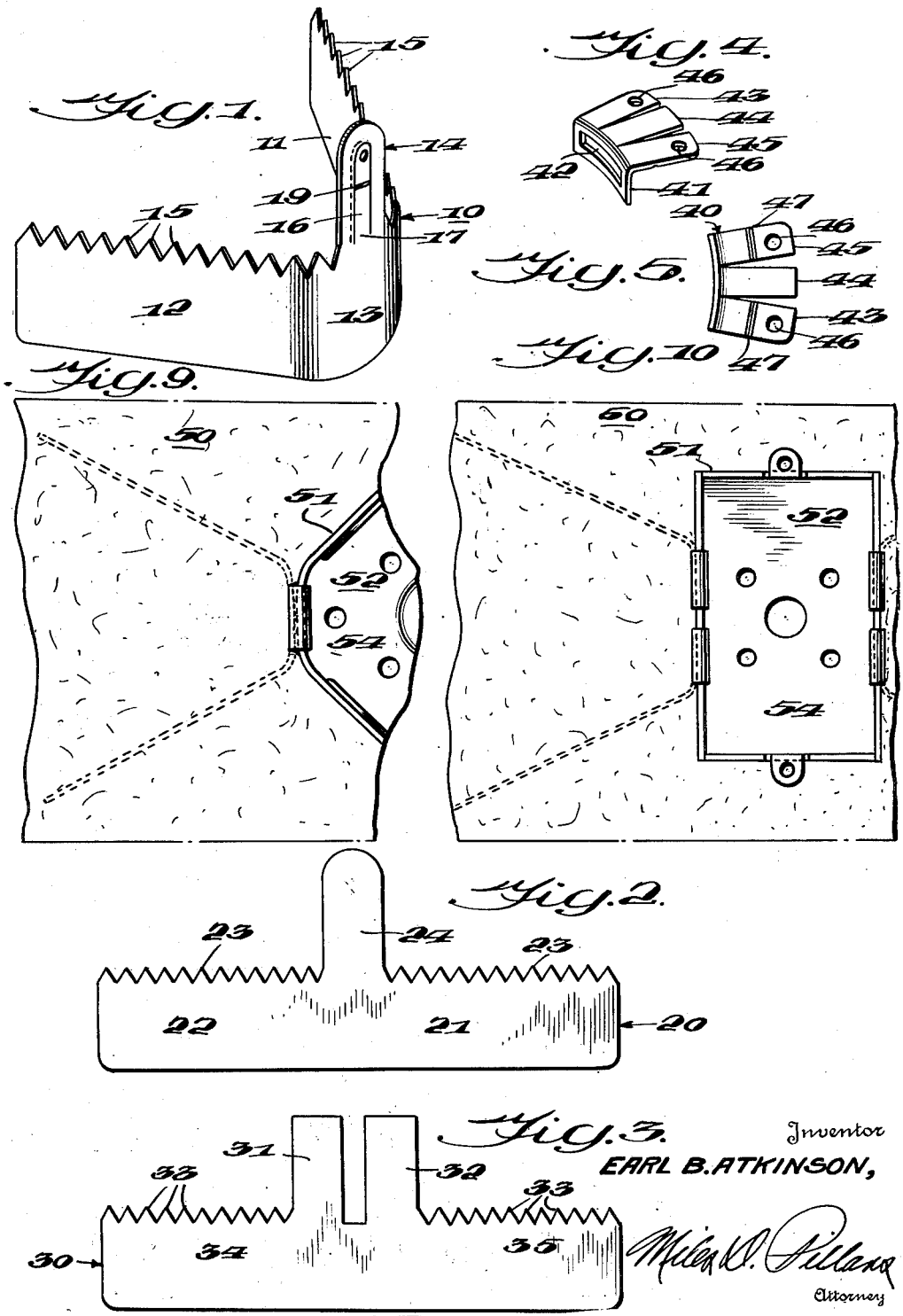
Inventor
EARL B. ATKINSON,
Attorney March 13, 1945.      E. B. ATKINSON      2,371,210
SUPPORT FOR WIRING RECEPTACLES
Filed Aug. 3, 1940      2 Sheets-Sheet 2
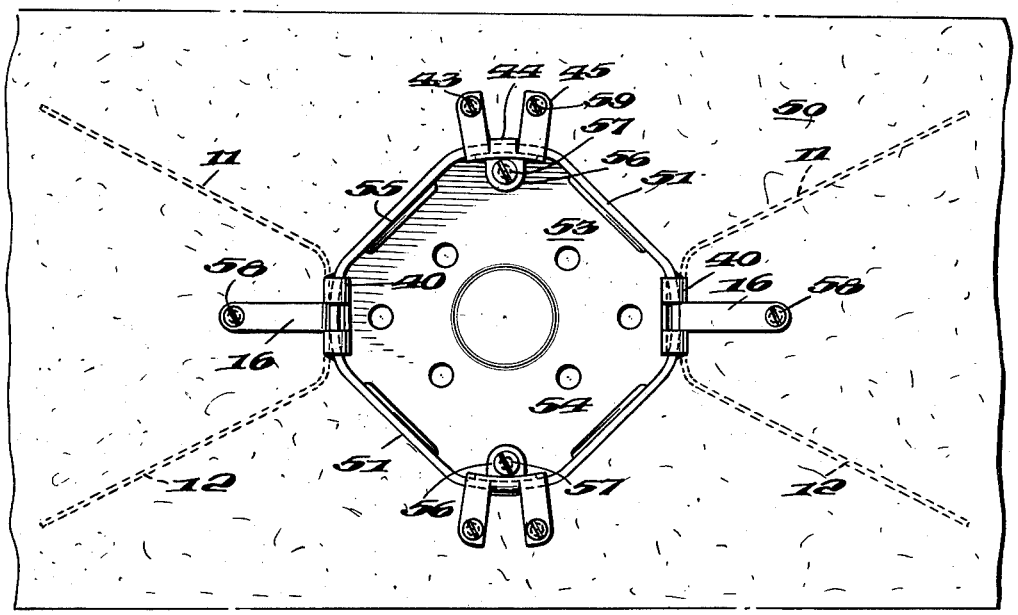
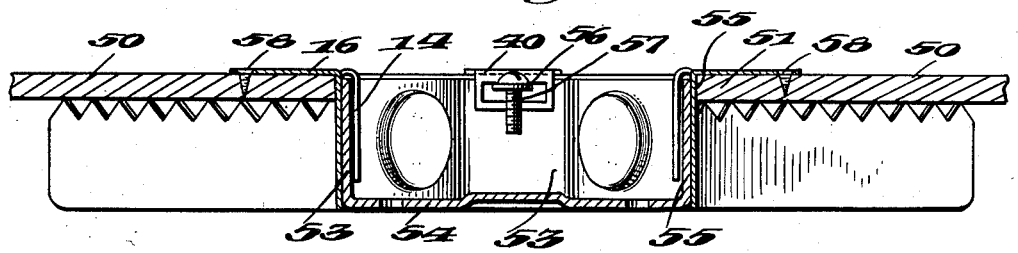
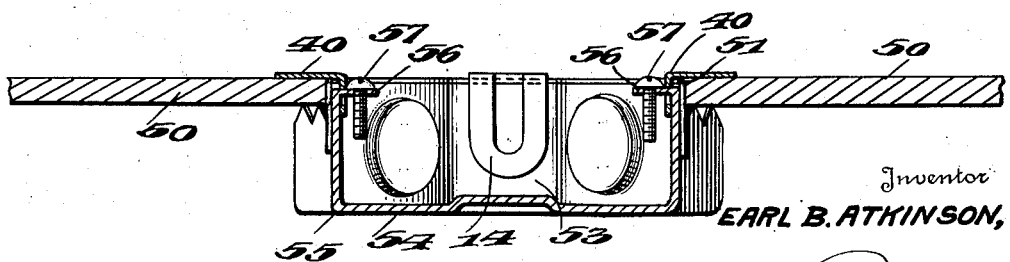
Inventor
EARL B. ATKINSON, Patented Mar. 13, 1945

2,371,210

UNITED STATES PATENT OFFICE 2,371,210

SUPPORT FOR WIRING RECEPTACLES

Earl B. Atkinson, Bay Village, Ohio

Application August 3, 1940, Serial No. 350,612

4 Claims. (Cl. 248—27)

This invention relates to improved supporting and holding devices for receptacles such as outlet boxes and switch boxes used in electrical wiring and more particularly the invention relates to improved supporting and holding devices for mounting receptacles such as outlet boxes and switch boxes in apertures provided in finished walls and ceilings where it is difficult to install the usual cross pieces between studding for bracing or supporting purposes without removing sections of the wall or ceiling.

An object of my invention is to provide improved supports for switch boxes, outlet boxes and other receptacles which may be installed in finished walls and ceilings in a secure manner so that the supports will not slip and become loose either during installation or after they have been installed in mounting relation with respect to the outlet or switch boxes.

Another object of my invention is to provide improved supports for receptacles such as switch boxes, outlet boxes and the like which will hold the boxes securely in place without the use of nails or screws and which may be mounted through apertures in supporting walls adapted to receive and accommodate the outlet and switch boxes.

Another object of my invention is to provide improved supports for receptacles such as outlet boxes, switch boxes and the like which are provided with serrations on the portions of the supports which are adapted to engage the inner side of the wall or ceiling so that the supports may be securely anchored in place in position for mounting the receptacles.

Another object of my invention is to provide improved supporting ears for wiring receptacles, such as outlet boxes and switch boxes, which may be installed on boxes of any size or diameter and which serve to provide outside supporting ears for use in mounting the boxes in walls and ceilings formed of concrete, brick, plaster, composition board and the like.

It is a further object of this invention to provide improved supporting ears having separable portions formed by lines of weakness whereby the portions may be separated after they have served their purpose.

These and other objects and advantages of the invention will be apparent from the following description, the appended claims and the accompanying drawings and in which:

Figure 1 is a perspective view of one form of the improved supporting device;

Figure 2 is a side elevation of a modified form of the improved supporting device;

Figure 3 is a side elevation of another modified form of the improved supporting device;

Figure 4 is a perspective view of an improved receptacle or box supporting ear;

Figure 5 is a bottom view of the improved supporting ear showing the lines of weakness on the outside projections;

Figure 6 is a plan view discloseing the method of mounting an outlet box employing two improved supporting devices shown in Figure 1 and two improved supporting ears shown in Figures 4 and 5;

Figure 7 is a side elevation of the construction shown in Figure 6;

Figure 8 is an end elevation of the construction shown in Figure 6;

Figure 9 is a fragmentary plan view showing the method of mounting an outlet box with the improved supporting device shown in Figure 2; and Figure 10 is a fragmentary plan view showing the method of mounting a switch box with the improved supporting device shown in Figure 3.

One form of the improved support of this invention is shown in Figure 1 and designated by reference numeral 10. The support is formed from relatively thin and flat material such as sheet metal in an elongated manner and is provided with wing sections 11 and 12 formed integrally with a central portion 13 upon which a projection 14 is centrally positioned which extends laterally beyond one edge of wings 11 and 12 as shown in Figure 1. An edge of the wings 11 and 12 on the side from which the projection 14 extends is provided with a series of teeth or serrations 15 for purposes which will later be explained. The projection 14 is provided with a bendable tongue member 16 which is separable from the projection on three sides thereof and which may be bent away from the support 10 on line 17 to provide a securing means for anchoring the support 10. Tongue member 16 is provided adjacent the end thereof with an aperture 18 and a line of weakness 19 extending laterally across the tongue intermediate its ends.

A modified form of a support is shown in Figure 2 and designated by reference numeral 20. This support is similar to that shown in Figure 1 in that wings 21 and 22 are provided with edges having a plurality of teeth or serrations 23 and a centrally located projection 24 is provided which extends on the same side of support 20 as the serrations 23 and, as shown in Figure 2, the support 24 extends a distance beyond the serrations as shown.

Another modified form of a support 30 is shown in Figure 3 which is similar to the support shown in Figure 2 except that two projecting members 31 and 32 are provided which project a distance beyond the edge of wings 34 and 35 on which serrations 33 are located. Projecting members 31 and 32 are centrally located with respect to the wings 34 and 35. It is contemplated that the top of the projections 31 and 32 may be rectangular as shown in Figure 3 or curved as projection 24 of Figure 2 without departing from the scope of this invention.

The improved box supporting ears of this invention are shown in Figures 4 and 5 and are designated generally by reference numeral 40. The supporting ears comprise body portions formed of relatively flat material and are provided with a flange 41 which contains an elongated aperture 42. The supporting ears are provided with three aligned projections 43, 44 and 45, and the two outer projections, i. e., 43 and 45, are provided with apertures 46 adjacent the ends thereof and lines of weakness 47 on their bottom sides intermediate the ends thereof as best shown in Figure 5. The supporting ears are preferably formed in a curved or arcuate manner as shown in Figures 4 and 5 so that the flange 41 will fit adjacent the interior wall and overlie the top edge of a conventional outlet box and the projections 43, 44 and 45 project at substantially right angles from the flanged portion as shown in Figures 4 and 5.

The method of employing the supports for securing an outlet box, switch box or the like in finished walls or ceilings formed of lath and plaster, composition board and the like is shown in Figures 6 to 10, inclusive. In these figures the finished wall is represented by reference numeral 50 and comprises the supporting means for the receptacle supporting and holding devices of this invention. An aperture 51 is provided in the finished wall or ceiling which is slightly larger than the switch box 52 or the outlet box 53 which is to be mounted. The outlet boxes 53 and switch box 52 shown in Figures 6 to 10, inclusive, are of conventional construction and are formed with a bottom 54 and side walls 55. The outlet boxes are provided with lips 56 projecting from the interior walls of the box adjacent the top thereof which are threaded to receive screws 57.

In securing an outlet box 53 in a finished wall or ceiling aperture 51 with a support as shown in Figure 1, the wings 11 and 12 are bent in the manner shown in Figures 1 and 6 and then the support is inserted through the wall or ceiling aperture with the projection 14 and tongue 16 extending through the aperture and positioned against one side thereof. The serrated edges 15 of the wings 11 and 12 are pulled tightly against the back side of the wall and the serrations are embedded in the wall material in order to secure the support against slippage. Preferably two supports are employed to hold opposite sides of the receptacle and after the supports are in place and the serrations forced tightly against the inner side of the wall adjacent the receptacle aperture with the projections 14 extending along the side of the aperture, the outlet box is inserted in the aperture. The projection 14 of each of the supports is bent downwardly over the edge 55 of the box so that the projection lies adjacent the inner wall of the box and the tongue 16 may be bent in the opposite direction to lie in a flat manner adjacent the outer surface of the wall 50 as shown in Figure 6. A nail, screw or other securing means 58 may be used to maintain the tongue in place. When the supports are mounted in the manner described, the construction will appear as shown in Figures 6 to 8, inclusive. Application of the serrations 15 to the inside of the supporting wall and placement of the projection 14 over the edge and adjacent the inside of wall 55 of the box 53 and placement of the tongue 16 adjacent the outside surface of the supporting wall 50 serves to hold securely each of the supports 10 in place and to hold securely the box 53 against forward movement.

In order to maintain the outlet box 53 from moving rearwardly, supporting ears 40 are secured to the inner walls of the outlet box adjacent the oppositely positioned lips 56 in a manner to cause their projections to extend beyond the edge of the box. The supporting ears 40 are positioned with the lips 56 of the outlet box passing through the aperture 42 and the ears are secured with the flanges adjacent the box sides by screws 57 as best shown in Figure 7. When the supporting ears are mounted on the outlet box and the box is inserted in the wall aperture 55, the projections 43, 44 and 45 will extend beyond the edge of the box and contact the adjacent wall 50 thus serving as securing means against rearward movement of the box. Screws, nails or other securing means 59 passed through apertures 46 may be employed to secure the projections 43 and 45 to the outer face of the ceiling or wall 50.

Figure 9 shows the manner of securing an outlet box using the modified form of support shown in Figure 2. Figure 10 shows the manner of securing a switch box using the modified form of support shown in Figure 3. In each instance the supports are installed together with the receptacles in the manner described above and the serrated edges serve as means for preventing slippage between the support and the rear side of the wall due to the fact that the points of the teeth tend to dig into the wall surface and maintain the supports in place.

The supports described above can be employed to secure and mount receptacles such as switch boxes, outlet boxes and the like in finished walls and ceilings of various types and construction without removing large sections of the finished wall. It will be understood that the wings 11 and 12 may be of any desirable length and the projections 14, 24, 31 and 32 of the various modified forms may be made of sufficient length to accommodate the boxes when secured in walls of varying thickness. The wings may be curved or bent in any manner to pass through the aperture provided in the wall for the receptacle as long as the serrations are positioned to bite into the rear surface of the wall. The supporting ears are especially suitable for use in mounting boxes when using the supports although other types of supporting ears may be used. It will be understood that it is unnecessary to employ the supporting ears with switch boxes which have laterally extending ears adjacent the front edge of the boxes already mounted thereon.

In addition to the uses of the receptacle supports and supporting ears described above, other uses will be obvious to those skilled in the art. For example, the receptacle supports and supporting ears may be employed to mount receptacles such as outlet and switch boxes upon forms used in concrete work so that the boxes will be positioned with their front edges substantially flush with the surface of the hardened concrete. Mounting of the boxes is accomplished by securing the supports 10 to the inside of the concrete form by fastening means extending through apertures 18 of tongue member 16. The supporting ears are fastened to the inside of the concrete form in a similar manner by inserting nails or screws through apertures 46 of projections 43 and 45. After the concrete has been poured and hardened, the forms are removed and the secured portion of the tongue 16 and projections 43 and 45 are broken at the lines of weakness 19 and 47 and removed with the forms leaving the box secured in position in the hardened concrete.

Having thus described the invention with particularity with regard to its preferred forms, it will be obvious to those skilled in the art, after understanding the invention, that various other changes and modifications may be made therein without departing from the spirit and scope of the invention, and it is desired in the appended claims to cover all such changes and modifications as are within the scope of the invention.

I claim:

1. A receptacle support adapted to support a receptacle in an opening in a wall comprising an elongated thin flat member having a projection extending laterally from an edge thereof and serrations provided on the edge at opposite sides of the projection, said projection provided with a tongue formed in the central portion thereof and adapted to be bent over the surface of the wall, said tongue provided with a line of weakness extending laterally across the tongue intermediate the ends of said tongue.

2. A supporting ear for a receptacle comprising a body portion provided with an apertured flanged portion and a plurality of aligned projections extending at substantially right angles from said flanged portion.

3. A supporting ear for a receptacle comprising a body portion provided with an apertured flanged portion and a plurality of aligned projections extending at substantially right angles from said flanged portion, at least one of said projections provided with a line of weakness extending across the projection intermediate the ends thereof.

4. In combination with a wall having an aperture therein, a receptacle positioned in said aperture and having supporting ears engaging the front side of said wall to prevent rearward movement of said receptacle, an elongated relatively thin flat supporting member having a projection extending laterally from an edge thereof and serrations provided on said edge at opposite sides of said projection, said projection extending through the aperture beside the box and provided with a tongue formed in the central portion thereof, said projection being bent over the edge of said receptacle so that the projection lies adjacent the inner receptacle wall and said tongue being bent in the opposite direction so that the tongue overlies the front surface of said wall.

EARL B. ATKINSON.